United States Patent [19]

Tennenhouse et al.

[11] 4,137,527
[45] Jan. 30, 1979

[54] LIQUID LEVEL SENSING DEVICE

[76] Inventors: Clifford C. Tennenhouse, 1876 Boulan, Troy, Mich. 48084; Leonard Olshansky, 4833 Faircourt Dr., West Bloomfield, Mich. 48033

[21] Appl. No.: 816,333

[22] Filed: Jul. 18, 1977

[51] Int. Cl.² ............................................. G08B 21/00
[52] U.S. Cl. ..................................... 340/620; 340/514
[58] Field of Search ............... 340/244, 235, 242, 214; 73/304 R

[56] References Cited

U.S. PATENT DOCUMENTS 3,399,399  8/1968  Apfelbaum .................. 340/244 C

Primary Examiner—John W. Caldwell, Sr.
Assistant Examiner—Daniel Myer
Attorney, Agent, or Firm—Basile and Weintraub

[57] ABSTRACT

A liquid level sensing device comprises a housing enclosing a source of electrical energy and an alarm means for providing a warning signal when connected to the source of electrical energy. The device further comprises a sensing probe that has a pair of separated, electrical terminals adapted to be electrically connected when the terminals are immersed in an electrically conductive fluid. The electrical terminals are connected to the alarm means and the source of electrical energy such that the alarm means is activated when the terminals are immersed in the fluid. In the preferred embodiment of the invention the sensor is in the form of a probe adapted to be inserted into conduits disposed below the basement level of a building such that the sensing device is adapted to sense the level of water within the drain system and/or sump pump system of the building so as to provide a warning that a flooding condition in the basement exists prior to flooding.

1 Claim, 8 Drawing Figures

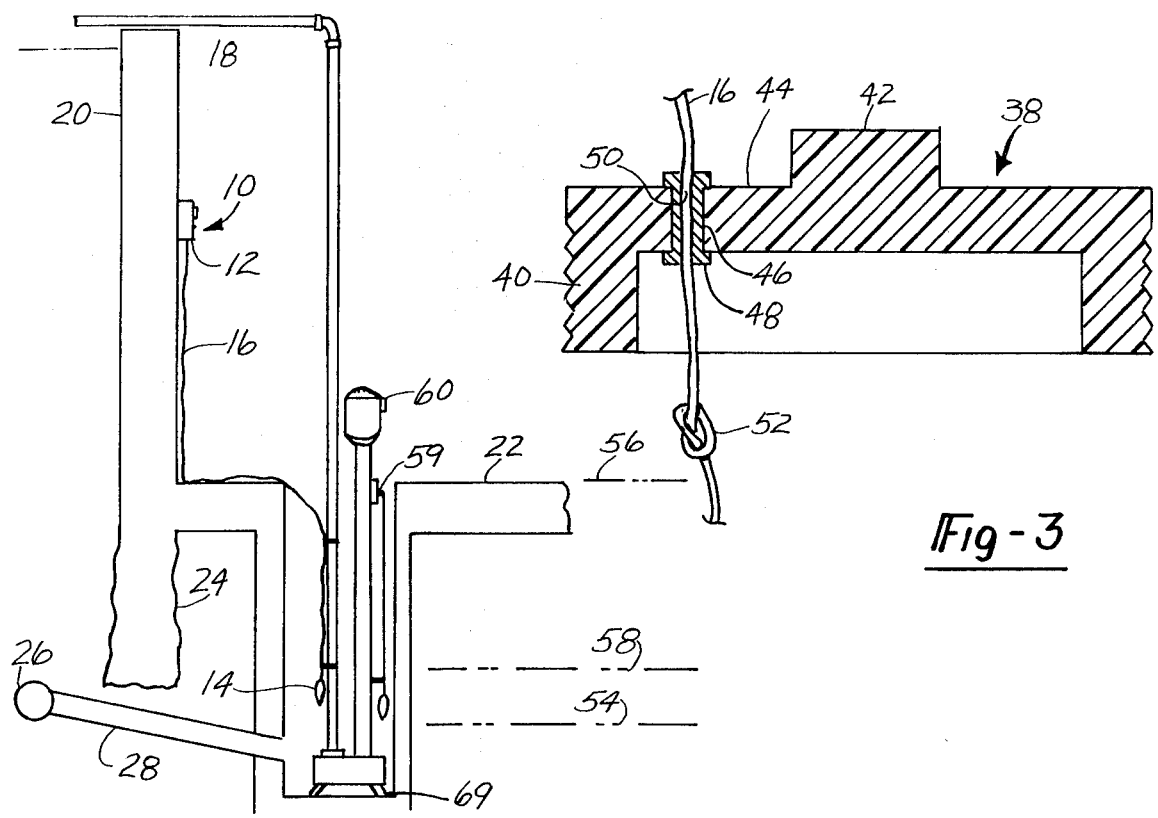
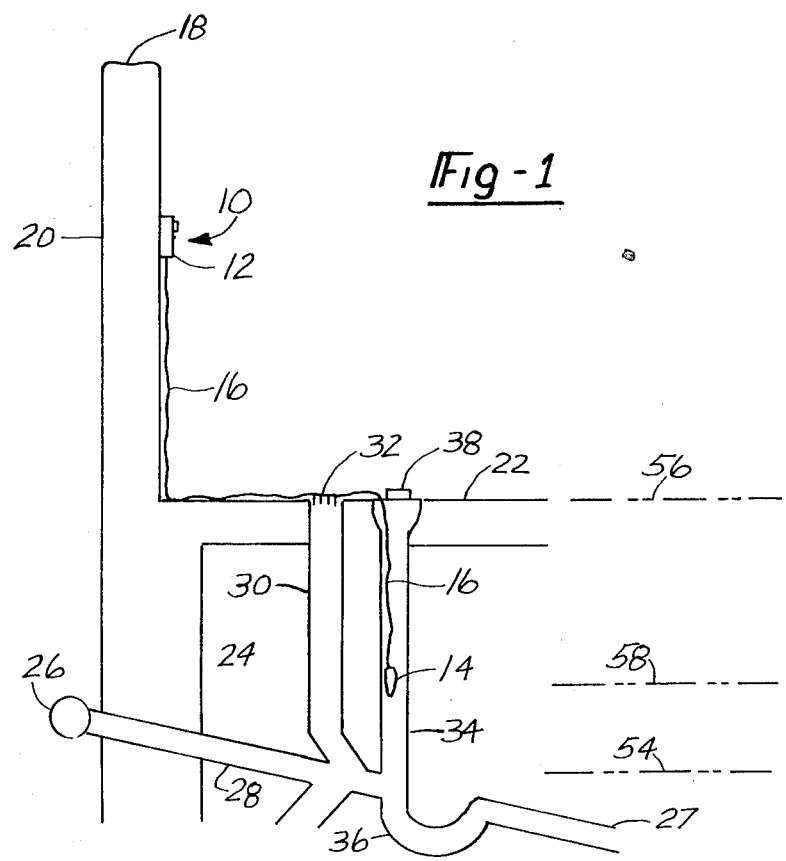

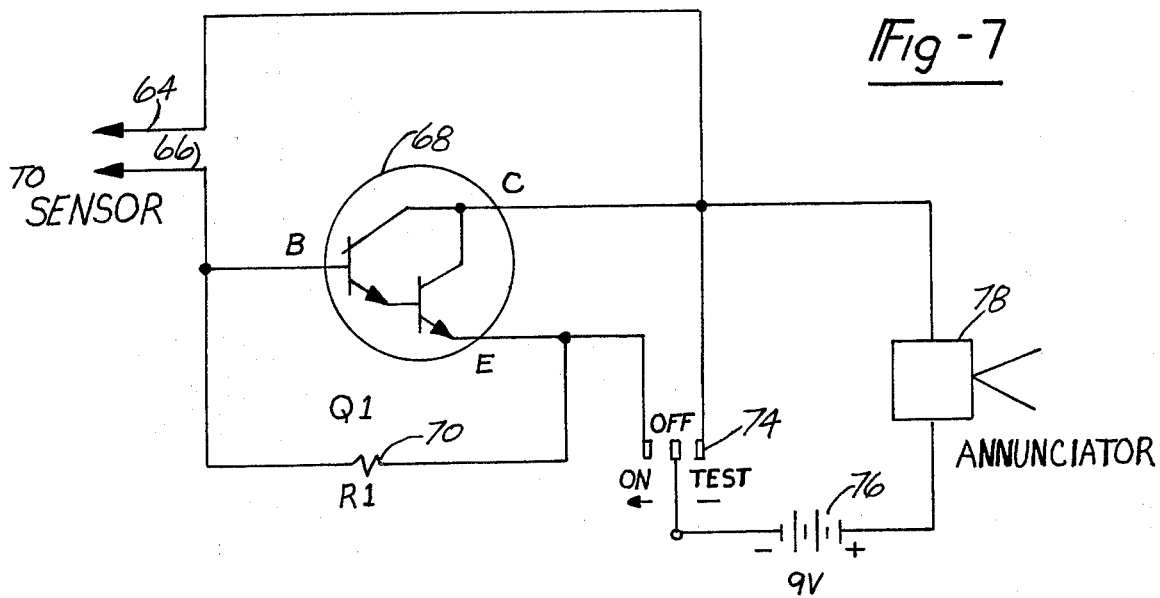
Fig-7
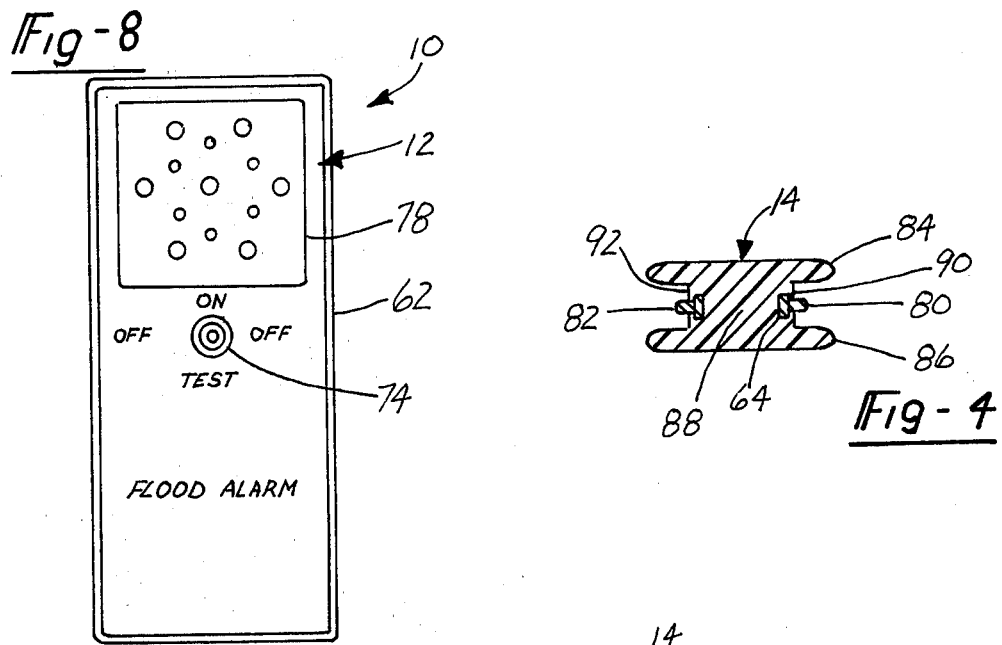
Fig-8
Fig-4
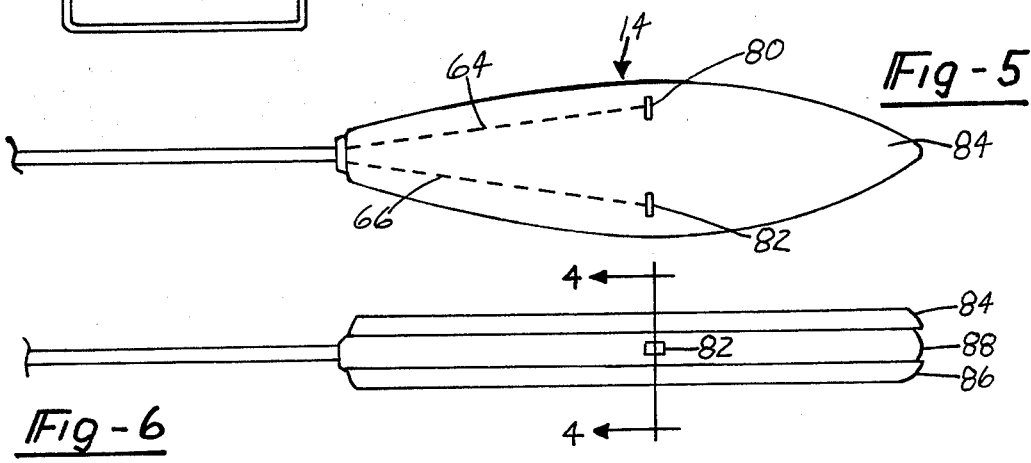
Fig-5
Fig-6

LIQUID LEVEL SENSING DEVICE

BACKGROUND OF THE INVENTION

1. Field of the Invention

The present invention relates to liquid surface level sensing devices and, more particularly, to an apparatus for sensing a liquid surface level reaching a predetermined height by means of using the electric conductivity of the fluid.

2. Description of the Prior Art

Heretofore, numerous apparatuses and devices have been employed for detecting the level of a liquid. Examples of such devices are disclosed in United States Letters Patents No. 1,055,099; No. 3,374,764; No. 3,680,579; and No. 3,817,274. These patents are relevant to the present invention in that they relate to indicators and alarms for indicating the height of a fluid, such as water, in tanks, vessels, and the like and for automatically sounding an alarm when a predetermined level has been reached. A particularly known problem is that associated with the flooding of basements within buildings. To the knowledge of the inventors, no known device has been made which is used within this environment and which is commercially available. The use of the devices in the aforementioned patents as applied to the basement environment falls short of some of the criteria desired for having an alarm in this environment. In the aforementioned patents, the devices disclosed would find use only after the basement has actually been flooded. It would therefore be desirable to provide a device and system for using the same wherein the occupants of the building may be advised in advance of the commencement of a flooding condition so that the occupants may be able to take sufficient action to minimize damages and/or prevent actual flooding from occurring.

Additionally, none of the prior art suggests the concept of utilizing the conductivity of the liquid itself to activate the alarm and thereby eliminate the necessity for moving parts, which are necessary elements of the devices disclosed in the aformentioned patents.

3. Prior Art Statement

The prior art listed hereinabove, in the opinion of the applicants, is the closest prior art of which the applicants are aware.

SUMMARY OF THE INVENTION

The present invention, which will be described subsequently in greater detail, comprises a liquid level sensing device comprising a sensing probe having a pair of spaced, electrical terminals that are adapted to be electrically connected when the terminals are inserted within a liquid that conducts electricity. The device further comprises a separately located housing mounting a source of electrical energy and an alarm means which provides a warning signal when it is connected to the source of electrical energy. Suitable conduit means are provided for interconnecting the terminal and alarm means to the electrical energy whereby the alarm means is activated when the terminals are immersed in the liquid.

It is therefore a primary object of the present invention to provide a new and improved liquid level sensing device which is simple in its construction and design and, thus, is economical and easy to manufacture.

It is a further object of the present invention to provide a water level sensing device which has virtually no moving parts and, thus, is reliable and has a longlife expectancy.

It is a further object of the present invention to provide a liquid level sensing device which has particular application for use in the basement of a building in order to detect the possibility of a flooding condition in the basement and to provide an early warning to the occupants of such a building.

Other objects, advantages and applications of the present invention will become apparent to those skilled in the art of liquid level sensing devices when the accompanying description of one example of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 1 is a fragmentary, cross-sectional view through the basement flooring of a building and schematically illustrating water conduits of the storm drain type and incorporating a fluid level sensing device constructed in accordance with the principles of the present invention;

FIG. 2 is a fragmentary, cross-sectional view through a building basement illustrating the liquid level sensing device being utilized in conjunction with water conduits employed in a sump pump type arrangement;

FIG. 3 is an enlarged, cross-sectional view through a clean-out opening cap illustrated in FIG. 1 of the drawings;

FIG. 4 is an enlarged, cross-sectional view of a sensing probe used in the liquid level sensing device illustrated in FIGS. 1 and 2 of the drawings and taken along Line 4—4 of FIG. 6;

FIG. 5 is a top elevational view of the sensing probe illustrated in FIG. 6 of the drawings;

FIG. 6 is a side elevational view of the sensing probe;

FIG. 7 is a schematic, electrical diagram illustrating one example of an electrical circuit employed in connection with the liquid level sensing device illustrated throughout the several views; and FIG. 8 is a front elevational view of a control unit employed in the practice of the present invention.

DESCRIPTION OF THE PREFERRED EMBODIMENT

Referring now to the drawings and, in particular, to FIG. 1 wherein there is illustrated one example of the present invention in the form of a level sensing device 10. The level sensing device 10 comprises a control unit 12 and a sensing probe 14 which are electrically connected by electrical conduits 16, all of which will be described in greater detail hereinafter. FIG. 1 is exemplary of a building 18 having a basement wall 20 and a basement floor 22. As is conventional with such buildings, the building 18 is provided with a foundation 24 which includes a foundation drain tile 26 encircling the building. The foundation drain tile 26 is connected via suitable tile 28 to an outlet 27, such as a storm drain or the like. This system further comprises a first vertical conduit 30 connected to a conventional floor drain 32 and a second vertical conduit 34 which is upstream from a conventional trap 36. The vertical conduit 34 opens to the basement floor 22 and is enclosed by a clean-out cap 38. The clean-out cap 38, as can best be seen in FIG. 3, includes an outer threaded surface 40 which threadingly engages the threaded bore formed at the upper end of the vertical conduit 34. The clean-out cap 38 further comprises a square head 42 which facilitates its removal in the conventional manner. Still referring to FIG. 3, it can be seen that the top wall 44 of the clean-out cap 38 includes a vertical through bore 46 within which is inserted a molded plug 48 which, in turn, includes a through bore 50 through which the electrical conduit 16 is slidably disposed.

The level sensing device 10, as will be described in a much greater detail hereinafter, has its control unit 12 mounted to the inside surface of the basement wall 20 by any suitable fasteners, such as threaded screws or the like, that may extend through the control unit and into the basement wall 20. The conduit 16 leads from the control unit 12 through the through bore 50 of the clean-out cap 38 and to the sensing probe 14 which is suspended at a predetermined height, as will be described hereinafter. A knot 52 in the electrical conduit 16 permits the electrical conduit 16 to be pulled upwardly until it engages the bottom of the plug 48 so that the length of the conduit 16 between the cap 38 and the sensing probe 14 can be accurately controlled in a very simple manner. In practice, when the outlet 27 to the storm drain becomes plugged or clogged, the water level in the drain system will quickly rise to the ground water table level 54, and the water at the ground table level 54 will then rise at rates that may exceed one foot per day depending upon rainfall, seepage rates, and the storage capacity of the earth under the basement. By positioning the sensing probe 14 at a location between the normal ground water level 54 and the basement floor level 56, a sensing probe level 58 is established. When the ground water table level reaches the sensing probe 14, an alarm in the control unit 12 will be activated, all of which will be described in greater detail hereinafter.

FIG. 2 illustrates an alternate embodiment of the present invention wherein the building 18 includes the basement wall 20, the basement floor 22, and the foundation 24. A conventional drain tile 26 is connected via tile 28 to the bottom of a sump 69. The sump 69 includes a sump pump 60 of conventional design which is adapted to maintain water within the sump at the normal water level 54. In a manner similar to that described with respect to the storm drain type system, when ground seepage water flows into the foundation drain tiles which are connected to the sump 69, a float operated switch 59 will automatically start the electric pump 60 whenever the water in the sump 69 reaches the float level. If, however, the sump pump 60 should fail due to corrosion or burnout of a switch or motor or any one of a number of mechanical or electrical failures, the water level in the sump 69 will start to rise above the normal water level 54. When the water level in the sump 69 reaches the sensing level 58, the sensing probe 14 will cause the alarm in the control unit 12 to be activated so as to provide a warning to the occupants of the building 18, all of which will be described in greater detail hereinafter.

Referring now to FIGS. 7 and 8 for a more detailed description of the control unit 12 which is illustrated as comprising a housing 62 that is mounted to the inside surface of the basement wall 20 and includes a means for storing the electrical components of the liquid level sensing device 10. As can be seen in FIG. 7, the components of the device 10 may include the sensing wires 64 and 66 which are carried by the electrical conduit 16 and are connected to the sensing probe 14, as will be described hereinafter. The electrical circuit includes a transistor 68 which may be in the form of a Darlington NPN amplifier transistor or equivalent. The circuit further includes a resistor 70 which is preferably a 300 K ohms, ¼ watt resistor. The resistor and transistor 68 are electrically connected to an on-off test switch 74 which, in turn, communicates the aforementioned components with an electrical battery 76 and an annunciator 78. The annunciator 78 may be any of the many types available on the market including one marketed by Projects Unlimited, Model No. X-11P. In the present embodiment, the device 10 is shown as an enclosed system having its own source of energy, namely, the battery 76; however, it should be understood that the device 10 may equally be designed to operate from house current. The annunciator 78 is designed to provide a penetrating beeping tone that can usually be heard throughout the building 18 within which the device 10 is installed. Other warning signals, such as flashers, bells, buzzers or other audio or visual annunciator devices, may be used. The device 10 should be such as to provide operation for a considerable period of time so as to provide warning to the occupants of the building 18 that a flooding condition is about to begin. Depending upon the type of flooding condition that exists and the level of the sensing probe 10 between the normal ground level 54 and the basement floor level 56, the amount of advanced warning may be anywhere from several minutes to several weeks before actual flooding occurs. In large buildings the control unit 12 may be located at a position remote from the probe 14 so that persons in an occupied area will hear the warning regardless of how far they are from the sensing probe 14.

It can be seen that by moving the switch 74 to the left (as viewed in FIG. 7) and causing a contact, the device 10 becomes operable. By moving the switch 74 to the right, the battery 76 is connected directly to the annunciator 78, and the battery 76 and annunciator 78 may be tested.

As can best be seen in FIGS. 4, 5 and 6, the electrical wires 64 and 66 that are carried by the electrical conduit 16 are connected to a pair of electrical sensor terminals 80 and 82, respectively. The electrical sensor terminals 80 and 82 are carried by a bullet-shaped sensing probe 14 which is preferably manufactured from a urethane or other insulating material and has a generally H-shaped cross section including upper and lower flanges 84 and 86 interconnected by the intermediate section 88. The metal electrical sensor terminals 80 and 82 are carried on the outside walls 90 and 92 of the intermediate section 88. This provides an important function in the sensing probe 14 in that it provides a tortuous path between the two metal terminals 80 and 82 to thereby prevent an accidental, electrical connection of the two terminals, which could occur, for example, if water was accidentally splashed onto the probe. The tortuous path also prevents accidental connection by condensed water or by a thin layer of algae, fungus, dirt or other similar substance that would otherwise have to be more frequently cleaned off the sensing probe 14.

The bullet shape of the sensing probe 14 facilitates its simple and easy insertion into the vertical drain tile 34 and permits its passage through curved sections of the tile, if the same should exist. It can thus be seen that when the water in the system rises to the sensing level 58 and the water comes in contact with both metal terminals 80 and 82, the circuit between the battery 76 and the annunciator 78 is closed, and the same will be activated to provide a loud beeping noise so as to provide a warning to the occupants of the building 18 that a flooding condition is about to commence. As long as the water level in the system is above the sensing level 58, the control unit 12 will continue to provide the warning signal. If the water level should drop, the device 10 will automatically be turned off as the sensing unit circuit is broken when the water level drops below the sensing level 58 and breaks contact between the metal terminals 80 and 82. Because of its unique shape, the sensing probe 14 may be placed in a harsh environment, as it will not activate earlier because of the large tortuous surface path that the electricity must follow. Thus, the sensing probe 14 must be inserted into a sufficient amount of water so that both terminals of the probe are in contact with the same body of water. It becomes obvious that the accidental touching of one terminal against a metal component, such as a pipe, will not cause activation of the device 10.

It can thus be seen that the applicants have provided a sensing probe which has no moving parts and which utilizes the electrical conductivity of the liquid medium whose level is desired to be sensed in order to activate a device, such as an alarm, to provide a warning to the occupants of the building that the water level has risen above a certain predetermined level.

It should be apparent to those skilled in the art of such level sensing devices that other forms of applicants' invention may be had and other applications including the sensing of liquid levels in boiler rooms or tunnels in order to determine overflow conditions, pumping failures, plug-ups, equipment failure, and the like. It should also be apparent to those skilled in the art that applicants' inventive liquid level sensing device 10 has other applications in addition to that disclosed in FIGS. 1 and 2 including, but not limited to, industrial uses, such as detecting the level of the height of a fluid in a storage tank or the detection of water levels in a sewage treatment plant.

Although only two examples of applicants' invention have been disclosed, it should be apparent to those skilled in the art of fluid level sensing devices that other forms of applicants' invention may be had, all coming within the spirit of the invention and scope of the appended claims.

What is claimed is as follows:

1. A liquid level sensing device adapted to be inserted in a basement sump or drain pipe for detecting the level of water below the basement level of a building, said water level sensing device comprising:

a sensing probe having first and second spaced electrical sensor terminals adapted to be electrically connected when said sensor terminals are immersed in water in said sump or pipe;

a source of electrical energy;

an alarm means for providing a warning signal when connected to said source of electrical energy;

electrical wires interconnecting said terminals and said alarm means to said source of electrical energy whereby said alarm means is activated when said sensor terminals are immersed in said water;

said sensing probe made from an electrically insulating material and having an element with an upper and lower section connected by an intermediate smaller section so as to define a pair of walls on said smaller section inwardly spaced from the outer edges of said upper and lower walls; said electrical sensor terminals being carried on opposite outer walls of said smaller section such that the path of electrical communication between said electrical sensor terminals is around said upper and lower surfaces; a portion of said wire connected to said sensor terminals being embedded in said smaller section, said pair of walls on said smaller section being inwardly spaced from the outer edges of said upper and lower walls a distance sufficient to prevent said sensor terminals attached thereto from contacting the wall of said sump or pipe wherein said probe has been positioned when the upper or lower walls of said probe contact a wall of said sump or pipe;

a housing mounting said alarm means, said housing being mounted at a position remote from said water and connected to said sensing probe by means of said electrical wires; and a switching deviced wired such that the alarm means remains on after the water recedes below the level of the sensing probe until it is reset, whereby the system will deliver a warning of impendent flood.

\* \* \* \* \*